United States Patent [19]
Wilk et al.

[11] Patent Number: 4,517,334
[45] Date of Patent: May 14, 1985

[54] POLYOL-MODIFIED ALKYD RESINS

[75] Inventors: Hans-Christoph Wilk, Neuss; Bernd Wegemund, Haan; Manfred Gorzinski, Duesseldorf, all of Fed. Rep. of Germany

[73] Assignee: Henkel Kommanditgesellschaft auf Aktien, Duesseldorf, Fed. Rep. of Germany

[21] Appl. No.: 561,630

[22] Filed: Dec. 15, 1983

[30] Foreign Application Priority Data

Dec. 16, 1982 [DE] Fed. Rep. of Germany ....... 3246616
Jul. 22, 1983 [EP] European Pat. Off. ..... 83107207.9

[51] Int. Cl.³ .............................................. C08L 67/00
[52] U.S. Cl. .................................... 524/539; 524/601; 528/295.3; 528/295.5; 528/296; 528/297; 528/302; 528/303
[58] Field of Search .................. 528/295.3, 295.5, 296, 528/297, 302, 303; 524/539, 601

[56] References Cited

U.S. PATENT DOCUMENTS

| 4,031,047 | 6/1977 | Dhein et al. | 528/295.5 X |
|---|---|---|---|
| 4,039,495 | 8/1977 | Humsucker | 260/22 |
| 4,042,547 | 8/1977 | Kaiser et al. | 528/295.5 |
| 4,049,599 | 9/1977 | Lott | 528/295.3 X |
| 4,179,420 | 12/1979 | Laganis | 528/296 X |
| 4,200,560 | 4/1980 | Kubo et al. | 528/297 X |
| 4,220,568 | 9/1980 | Patzsche | 528/295.3 |
| 4,248,745 | 2/1981 | La Ganis | 528/296 X |
| 4,271,051 | 6/1981 | Eschwey | 260/22 |
| 4,333,865 | 6/1982 | Zückert | 528/297 X |
| 4,390,688 | 6/1983 | Walz et al. | 528/296 X |

Primary Examiner—Lucille M. Phynes
Attorney, Agent, or Firm—Ernest G. Szoke; Mark A. Greenfield; Henry E. Millson, Jr.

[57] ABSTRACT

Alkyd resin mixtures for use in stoving water lacquers which contain polyols having an average molecular weight of from 200 to 2000 g/mole, an average —OH functionality of >2, and terminal groups of the formula, —CHR—OH in which R=—H, —CH₃, or both —H and —CH₃.

21 Claims, No Drawings

POLYOL-MODIFIED ALKYD RESINS

BACKGROUND OF THE INVENTION

This invention relates to lacquer binders and provides new alkyd resins and alkyd resin mixtures for use in stoving water lacquers.

In recent years, numerous efforts have been made to provide stoving lacquers which, on stoving, give off hardly any volatile atmosphere-polluting substances. For example, it has frequently been proposed to use as binders carboxyl group-containing alkyd resins which can be dissolved in aqueous solvent mixtures after neutralization with amines. Alkyd resins suitable for this purpose generally have acid numbers of from 40 to 80 mg of KOH/g. The use of alkyd resin dispersions which have acid numbers of from $<30$ mg of KOH/g or even $<10$ mg of KOH/g, but which contain emulsifiers, is also known.

Finally, alkyd resin microemulsions are known which have acid numbers of from 5 to 35, but which contain no volatile solvents and only emulsifiers of the type which lose their hydrophilicity on stoving. Thus, U.S. Pat. No. 4,271,051 describes alkyd resins containing numerous 2,3-dihydroxy propyl groups through the reaction of free carboxyl groups with glycidol. By selecting suitable amines, emulsifiers and crosslinking agents (generally melamine resins), it is possible to produce from these alkyd resins optioally clear aqueous preparations (microemulsions) which on stoving give off hardly any harmful constituents to the atmosphere.

Although these alkyd resins are largely satisfactory both in terms of processibility into water lacquers and in terms of environmental considerations, there is still a need to improve the technical properties of lacquer films obtainable therefrom. Thus, the resistance to water (as determined by the "sweatbox" test) and also the flexibility of the lacquer films, despite their considerable hardness, are in need of improvement without however producing any adverse effects upon their other favorable technical properties.

It is known from U.S. Pat. No. 4,039,495 that trimethylol nitromethane may be used as an additive for increasing the flexibility of alkyd resin lacquers. Unfortunately, this highly hydrophilic additive reduces the resistance of the lacquer films to water very considerably. Attempts to obtain flexible lacquers by increasing the fatty acid content of the alkyd resins were also unsuccessful because resins of this type could not be made up into water lacquers without the use of solvents.

DESCRIPTION OF THE INVENTION

Accordingly, one object of the present invention is to provide an alkyd resin which may be processed, particularly after neutralization, into water lacquers which, on stoving, give hard coatings combining improved flexibility with improved resistance to water. More particularly, one object of the invention is to improve alkyd resins having an acid number of from 5 to 35 mg of KOH/g and a content of 2,3-dihydroxy propyl groups, of the type described for example in U.S. Pat. No. 4,271,051, with respect to flexibility, while retaining their considerable hardness and their water resistance and without adversely affecting their other beneficial technical properties. Thus, the new resins can be made up into water lacquers, particularly optically clear water lacquers, without the use of volatile solvents or stoving-resistant emulsifiers.

In broad scope, the present invention relates to alkyd resin mixtures, for use in stoving water lacquers, which are produced from polybasic carboxylic acids or reactive derivatives thereof and polyhydric alcohols, optionally using monofunctional modifying agents, wherein the polyfunctional hydroxyl compounds which they contain are, at least in part, polyols having an average molecular weight of from about 200 to about 2000 g/mole, preferably from about 300 to about 800 g/mole, an average —OH functionality of $>2$, and terminal groups corresponding to the formula —CHR—OH, in which R=H and/or —CH$_3$. It is preferred that the alkyd resin mixtures contain from about 5 to about 30% by weight, preferably from about 10 to about 20% by weight, of the above polyols, based on the total weight of the alkyd resin mixture. The alkyd resin mixtures preferably have an acid number of from about 5 to about 35, more preferably from about 15 to about 30, and most preferably from about 20 to about 25, and an —OH number of $<100$ and more preferably $>200$ mg of KOH/g.

The invention also relates to alkyd resin mixtures wherein the mixtures contain polyols having an average molecular weight of from about 200 to about 2000 g/mole, preferably from about 300 to about 800 g/mole, an average —OH functionality of $>2$, and terminal groups corresponding to the formula —CHR—OH (R=H and/or CH$_3$) in admixture with conventional alkyd resins, and wherein the polyols are present in from about 5 to about 30% by weight of the mixture as a whole. The term "conventional alkyd resins" referred to above for resins used in these mixtures is understood to mean alkyd resins of the type described in U.S. Pat. No. 4,271,051, i.e. those having from about 5 to about 30% by weight of 2,3-dihydroxy propyl groups and an acid number of from about 5 to about 35; which can be prepared by reacting alkyd resins having an acid number of from about 40 to about 180 with glycidol, glycerol, or a mixture thereof in accordance with the teachings of the above patent.

In a first embodiment of the invention, the polyols used herein are polyether polyols, preferably those as defined above which contain on average more than 2 and up to 4 terminal —OH groups. Polyether polyols are well known per se and are used for example in the production of polyurethanes, in which instance—if they contain on the average more than 2 hydroxyl groups—they lead to crosslinking and hence to embrittlement, at least at high degrees of crosslinking. Accordingly, it was surprising to the expert on alkyd resins that polyether polyols containing more than 2 and up to 4 terminal hydroxyl groups, instead of diols, are suitable starting materials for the production of flexible lacquers when incorporated in the resins by condensation.

According to the invention, polyether polyols having molecular weights of from about 200 to about 2000 and preferably from about 300 to about 800 can be employed. With molecular weights lower than about 200, the flexibilizing effect diminishes. With molecular weights higher than about 2000, the improvement in resistance to water is occasionally not obtained. The polyether polyols should be synthesized in such a way that the hydroxyl groups are situated as far apart from one another as possible. The polyether polyols are preferably synthesized in such a way that the longest chain present in the molecule contains terminal hydroxyl groups at both ends.

It is preferred to use polyether polyols containing at least 2 or even more than 2 terminal primary hydroxyl groups. On the other hand, however, polyether polyols which at least in part contain terminal secondary hydroxyl groups and especially those containing from 1 to 4 terminal secondary hydroxyl groups also give favorable results provided that they satisfy the other requirements therefor given above.

Although the polyester polyols according to the invention are primarily branched compounds, linear polyols which, in addition to the terminal hydroxyl groups, also contain 1 or 2 internal hydroxyl groups are also suitable for use herein.

More specifically, the polyether polyols suitable for use in accordance with the invention can best be described by the process for their production.

Thus, polyether polyols suitable for the purposes of the invention are obtained by reacting either low molecular weight trifunctional alcohols containing from 3 to 6 carbon atoms, such as for example glycerol, trimethylol ethane, or trimethylol propane, or low molecular weight tetrafunctional alcohols, such as pentaerythritol or di-(trimethylolpropane), with cyclic ethers containing from 2 to 4 carbon atoms, such as ethylene oxide, propylene oxide, butene oxide, isobutene oxide or tetrahydrofuran, in the presence of catalysts. In order to obtain molecular weights of from about 200 to about 2000, the ratio between the polyfunctional alcohol and the cyclic ether is adjusted to between about 1:3 and about 1:40.

In another embodiment of the invention, in addition to or instead of polyether polyols, corresponding polyester polyols containing more than 2 and, more particularly, up to 4 hydroxyl groups can be used herein. Polyester polyols such as these may be produced by reacting the above-mentioned low molecular weight alcohols with caprolactone or its higher homologs in a known manner. Preferred polyester polyols are the reaction products of glycerol, trimethylol ethane, trimethylol propane or pentaerythritol with 3 to 6 moles of caprolactone.

The polyols employed in accordance with the invention can also be used to prepare novel modified alkyd resins. In the present context, modification is understood to mean the use of monofunctional or monofunctionally reacting starting materials. Thus, it is possible to produce polyol-containing alkyd resins which are modified with fatty acids, with long-chain alkene oxides, or with fatty alcohols. The modifying agents are normally used in quantities of from about 5 to about 40% by weight.

Fatty acids which can be used in the polyol-containing alkyd resins are blends of natural fatty acids, i.e. the hydrolysis products of naturally occurring oils and fats or of mixtures thereof. Natural fatty acids such as these are unbranched and contain an even number of carbon atoms of from 8 to 22 and preferably from 12 to 18. They can also contain one or more double bonds. Suitable fatty acid blends are, for example, blends of coconut oil, soy oil, sunflower oil, peanut oil, or of animal fats, such as tallow.

Suitable olefin oxides which can be used together with the polyols in alkyd resins contain from 8 to 20 carbon atoms or even up to 22 carbon atoms. In this instance, it is possible to use both olefin oxides containing an internal epoxide group and olefin oxides containing a terminal oxide group, and also mixtures thereof. Linear and branched-chain olefin oxides can also be used. The olefin oxides are used in quantities of from about 5 to about 40% by weight. In this connection, it may be preferable to react the olefin oxides either in a preliminary reaction or during the condensation reaction with polybasic carboxylic acids, particularly dicarboxylic acids, to form monoesters of the acids, and to use these monoesters in the same molar quantities as fatty acids. The use of olefin oxides in alkyd resins is generally known and is described, for example, in German Applications Nos. 26 20 726 and 28 15 096.

In addition, alkyd resins of the invention which contain long-chain alcohols as modifying agents can be produced which are based on polyols. Suitable long-chain alcohols are the reduction products of natural fatty acid esters. Such fatty alcohols contain from 8 to 22 carbon atoms and preferably from 12 to 18 carbon atoms. However, alcohol-modified alkyd resins are not widely used in practice.

In addition to the above-mentioned modifying agents, branched, polybasic carboxylic acids can be used as modifying agents. However, branched-chain synthetic fatty acids e.g. isononanoic acid are preferred for use herein.

The modified polyol-containing alkyd resins of the invention can be produced with different structures and, in particular with different terminal groups using the methods generally applied in this art (described, for example, in the book entitled "Waterborne Coatings" by Charles R. Martens, Van Nostrand Reinhold Co., New York, 1981). Polyol-containing alkyd resins containing a sufficient number of hydrophilic terminal groups to enable them to be made up as aqueous lacquers are preferred. Thus, in a first embodiment of the invention, polyol-containing alkyd resins are produced having an acid number of from 25 to 80 and an —OH number of less than 100 mg of KOH/g. After neutralization, resins such as these are capable of forming aqueous solutions. They can contain fatty acids, alkene oxides and/or fatty alcohols as modifying agents, preferably natural unbranched fatty acids or long-chain α-olefin oxides containing from 8 to 20 carbon atoms.

In another preferred embodiment, the invention relates to modified alkyd resins having an acid number of from 5 to 40, preferably from 15 to 30 and, more particularly, from 20 to 25 and an OH number of greater than 100 mg of KOH/g and, preferably greater than 200 mg of KOH/g. Alkyd resins such as these can be made up into aqueous lacquers both by virtue of their salt-forming groups and also by virtue of their numerous —OH groups. Their properties are improved by use of the polyols of the invention, particularly the polyether polyols and/or the polyester polyols. Preferred modifying agents are blends of saturated or unsaturated natural fatty acids in quantities of from about 5 to about 40% by weight, preferably in quantities of from about 10 to about 30% by weight, based on the alkyd resin, with corresponding quantities of α-olefin oxides.

In another embodiment of the invention, the alkyd resin mixtures of the invention are produced by subjecting the above polyols to condensation with other starting materials commonly used in alkyd resins at temperatures in the range from just above 100° C. to about 250° C. In this instance, aliphatic dicarboxylic acids, such as adipic acid, sebacic acid, glutaric acid, succinic acid, maleic acid or fumaric acid, aromatic dicarboxylic acids, such as phthalic acid and/or isomers thereof, tricarboxylic acids, such as trimellitic acid, and optionally conventional polyfunctional alcohols, such as ethylene glycol, propylene glycol, glycerol, trimethylol ethane, trimethylol propane or pentaerythritol and, optionally, monofunctional modifying agents, are condensed together with the polyols of the invention.

Instead of using the above-mentioned carboxylic acids, it is also possible to use reactive derivatives thereof. In this context, reactive derivatives of carboxylic acids are understood to be, in particular, their anhydrides. Thus, those skilled in this art would use maleic acid, phthalic acid and/or trimellitic acid, preferably in the form of their anhydrides or partial anhydrides. Other reactive derivatives of carboxylic acids are their esters, particularly their esters with monofunctional, readily volatile alcohols, for example the methyl or ethyl ester.

The polyols according to the invention can be used in quantities of from about 5 to about 60% by weight, based on the alkyd resin. They are preferably used in quantities of from about 5 to about 30% by weight, more preferably in quantities of from about 5 to about 25% by weight, and most preferably in quantities of from about 10 to about 20% by weight, based on the alkyd resin. In this connection, it is advisable in many cases to replace a standard, low molecular weight, polyfunctional alcohol, for example glycerol or trimethylol propane, in equivalent quantities by the polyols of the invention.

Insofar as the condensation process and, hence, the structure of the alkyd resins according to the invention are concerned, the polyols can be incorporated both in a single-stage condensation reaction and also in a multistage condensation reaction. The multistage variant affords the advantage of a more defined structure of the molecule. It is possible, for example, to first react the polyols of the invention, either as such or in admixture with other hydroxyl-group-containing components, with the carboxylic acids used for modification, i.e. fatty acids, until they have been completely esterified, and then to condense new constituents, for example dicarboxylic acids or dicarboxylic acids and hydroxy compounds, onto the resin thus formed until the required indices, i.e. an acid number of from about 5 to about 40 and preferably from about 15 to about 20 and a sufficiently high —OH number, for example greater than 100 mg of KOH/g or greater than 200 mg of KOH/g, are reached. More particularly, those skilled in this art should refer here to the state of the art in the field of alkyd resins.

Flexibility and resistance to water of coatings based on alkyd resin water lacquers can be obtained not only by co-condensing the polyols according to the invention with alkyd resin reaction mixtures, but also by subsequent addition thereto. Although this effect is not fully understood, it is assumed that, under stoving conditions, the polyols are incorporated in the resin molecules so that coatings of resins containing the polyol in co-condensed form ultimately differ at most only slightly from coatings of resins containing the polyol in subsequently added form. In another embodiment, therefore, the invention relates to mixtures of conventional alkyd resins and the polyols according to the invention, characterized by a polyol content of from about 5 to about 30% by weight, based on the mixture as a whole. It is preferred to use no more than about 20% by weight of polyol, based on the weight of the mixture.

The alkyl resins produced by the methods described above can be made up into water lacquers, i.e. solvent-free, optically clear aqueous alkyd resin preparations (microemulsions) made up in the presence of neutralizing agents, emulsifiers which lose at least some of their hydrophilicity on stoving, and if desired, auxiliary solvents. Advantageously, the alkyd resin mixtures of the invention are present in a quantity of from about 20 to about 60% by weight, based on the weight of the total lacquer system. Such lacquer systems are colloidal solutions or aqueous dispersions, depending upon their hydrophilicity.

However, it is particularly preferred not to use auxiliary solvents. In addition, it is particularly preferred to use emulsifiers of the type which lose at least some of their hydrophilicity under stoving conditions. Emulsifiers such as these may be synthesized in such a way that they contain a hydrophilic group which decomposes under stoving conditions. Suitable emulsifiers of this type are, for example, amine oxides. On the other hand, however, it is also possible to use emulsifiers which are incorporated in the resin through hydroxyl groups under stoving conditions. Suitable emulsifiers of this type are, in particular, the adducts of glycidol with fatty alcohols or alkyl phenols. Thus, favorable results are obtained with the reaction products of nonyl phenol with 6 to 10 moles of glycidol.

It is also particularly preferred to select neutralizing agents of the type which are nonvolatile under stoving conditions and which are incorporated in the resin but which do not produce any adverse changes, such as discoloration for example. Suitable neutralizing agents are, in particular, aminoalcohols, among which those containing 2,3-dihydroxy propyl groups on the nitrogen are preferred. The production of aminoalcohols such as these by reacting glycidol with primary or secondary amines is described in U.S. Pat. No. 4,259,219. Particularly suitable aminoalcohols are, for example, the reaction products of 2 moles of glycidol with 1 mole of methylamine, ethylamine, propylamine and/or 2-methyl-2-aminopropanol, or diethanolamine reacted with 1 mole of glycidol. Other suitable aminoalcohols are the compounds containing an internal primary amino group which are known from British Pat. No. 1,003,326, such as for example 2-aminopropane diol or tris-(methylol)-aminomethane ("tris").

As discussed above, the aqueous preparations of the alkyd resins according to the invention are colloidal solutions or dispersions (microemulsions), depending on their degree of hydrophilicity, which can be further processed with standard additives to form water lacquers. Reference is made here to the relevant chapter in the above-mentioned book by Charles R. Martens with respect to the preparation of water lacquers, the teachings of which are applicable to the alkyd resins of the invention. In order to obtain stoving water lacquers, crosslinking resin components are added. Particularly suitable crosslinking resin components are so-called amino resins and among these the reaction products of melamine, hexamethylol melamine hexaalkyl ethers, are particularly suitable. Particularly preferred are amino resins of the type which are solvent-free or at least substantially solvent-free or aqueous preparations. Several commercial products of this type are known to those skilled in this art.

Water lacquers based on the alkyd resins prepared in accordance with the invention can be pigmented by conventional methods. More specifically, general knowledge of water lacquers, particularly so far as the choice of pigments and other auxiliaries is concerned, is applicable here. Stoving of the lacquer films is carried out, if desired, after preliminary drying, at temperatures in the range of from about 120° to about 180° C., depending on the amino resin used, in suitable drying ovens or drying tunnels. In this connection, advantages are obtained by not using any organic auxiliary solvents whatever and, if desired, by not using any volatile amines.

The lacquers containing the alkyd resins of the invention can be used for coating a variety of different materials, such as glass or metals, for example aluminum, iron, steel and the like. The correspondingly stoved coatings are distinguished by their high flexibility, even where they are hard, by their good adhesion to metals (even in pigmented form), by their high gloss and by their increased resistance to condensed moisture. They are distinctly superior both to conventional emulsions and also to hitherto known alkyd resins having high acid numbers. Alkyd resins according to the invention having acid numbers of from about 5 to about 35 and —OH numbers of >100 attain and, in some cases, exceed the quality standard of alkyd resins of the type used or applied from solvents.

The following examples are given for illustration purposes only and are not intended to limit the invention.

EXAMPLE 1

Production of an alkyd resin containing 2,3-dihydroxy propyl groups:

The condensation reaction was carried out under nitrogen in a heatable esterification apparatus. The components for the first stage were heated together in the presence of 4.00 kg of xylene up to the desired acid number.

The following components were condensed:
6.16 kg of fractionated fatty acids (chain length distribution:
  60% by weight of caprylic acid
  35% by weight of capric acid
  3% by weight of lauric acid
  2% by weight of higher fatty acids)
2.28 kg of glycerol
7.45 kg of the reaction product of 1 mole of trimethylol propane with 6 moles of propylene oxide
11.08 kg of neopentyl glycol
9.88 kg of phthalic acid anhydride
7.68 kg of trimellitic acid anhydride
  Reaction time: 4 hours
  Reaction temperature: max. 190° C.
  Acid number: 70-80, measured 71.8
  2.25 kg of water were separated and the xylene was removed by distillation in vacuo.

The following components were reacted in a second reaction step:
40.99 kg of the alkyd resin (acid number 71.8) prepared above
2.64 kg of glycidol
1.20 kg of a 50% aqueous solution of glycerylamine (adduct of 1 mole of 2-amino-2-methyl propanol and 2 moles of glycidol)
  Reaction time: 90 minutes
  Reaction temperature: max. 140° C.
  Final acid number: 23.8

EXAMPLES 2-4

The procedures for these examples was that of EXAMPLE 1, except that 7.45 kg of the reaction product of trimethylol propane with 6 moles of propylene oxide was replaced by:

EXAMPLE 2

6.80 kg of the reaction product of glycerol with propylene oxide in a molar ratio of 1:6. Final acid number: 25.4

EXAMPLE 3

5.52 kg of the reaction product of glycerol with ethylene oxide in a molar ratio of 1:6. Final acid number: 22.9

EXAMPLE 4

7.30 kg of the reaction product of trimethylol propane with caprolactone in a molar ratio of 1:3. Final acid number: 24.3

COMPARISON EXAMPLE V-1

The following condensate which is a suitable base for water-dilutable alkyd resins was prepared for comparison purposes. The procedure of EXAMPLE 1 was repeated except that the reaction product of trimethylol propane with 6 moles of propylene oxide was replaced by the mole equivalent of trimethylol propane, i.e. a total of 2.11 kg of trimethylol propane was used.
Final acid number: 24.9

Production of Coatings

The alkyd resins prepared in the above examples were each mixed while heating with 4.90 kg of a 50% aqueous solution of the adduct of 7.5 moles of glycidol with 1 mole of nonyl phenol as an emulsifier and 9.20 kg of a 50% aqueous solution of the adduct of 2 moles of glycidol with 1 mole of 1-amino-2-methyl propanol. 2.06 kg of water were then added so that an alkyd resin microemulsion having a solids content of 85% was formed.

Production of a White Lacquer

A ground paste was prepared in a dissolver from (parts by weight):
50 parts of alkyd resin microemulsion, 85% in water, prepared above,
32 parts of deionized water,
30 parts of standard pigmenting aids (9 parts of a 30%, acid group-containing low molecular weight acrylate dispersion (PRIMAL I 94—a product of the Rohm & Haas Co.) and 1 part of 2-methyl-2-aminopropanol-2-glycidol, 7.5% in water),
183 parts of titanium dioxide (Kronos TITAN CL 310).
A lacquer was made up with:
309 parts of alkyd resin microemulsion, 85% in water,
131 parts of melamine resin (CYMEL 301, a product of American Cyanamid Co.),
265 parts of deionized water.
1000 parts of a white lacquer with an alkyd resin to melamine resin ratio of 7:3 and a pigment volume concentration of approximately 11% were obtained.

Testing of the Coatings

To test the films, the lacquers were sprayed onto steel plates and stoved for 15 minutes at 160° C. The dry films were between 40 and 50 μm thick. The results obtained are listed in the Tables.

TABLE 1

| Example No. | Properties of the Lacquers | | |
|---|---|---|---|
| | Pendulum hardness DIN 53157 | Indentation mm | Mandrel bending test 2 mm |
| 1 | 148 | 6.4 | passed |
| 2 | 146 | 6.3 | passed |
| 3 | 139 | 7.3 | passed |
| 4 | 151 | 6.0 | passed |
| V-1 | 196 | 2.7 | flakes |
| V-2+ | 151 | 3.1 | flakes |

+Comparison Example V-2:

The lacquer of comparison Example V-1 was stoved for 20 minutes at 150° C. rather than for 15 minutes at 160° C.

TABLE 2

| | "Sweatbox" test 40° C. Bubble assessment according to DIN 53 209 | | | | |
|---|---|---|---|---|---|
| No./hours | 24 | 48 | 120 | 168 | 216 |
| 1 | 0 | 0 | 0 | 0 | m1/g1 |
| 2 | 0 | 0 | m1/g1 | ½m4/g1 | ½m4/g2 |
| 3 | 0 | 0 | m1/g1 | m3/g1 | m4/g2 |
| 4 | 0 | 0 | m2/g1 | m3/g1 | m4/g3 |
| V-1 | 0 | m2/g1 | m4/g2 | m5/g3 | m5/g3 |

What is claimed is:

1. An alkyd resin mixture for use in stoving water lacquers comprising a mixture of alkyd resins containing the reaction products of polybasic carboxylic acids or reactive derivatives thereof and polyhydric alcohols, and, optionally, monofunctional modifying agents, wherein the polyhydric alcohol component thereof is at least in part one or more polyols having an average molecular weight of from about 200 to about 2000 g/mole, an average —OH functionality of >2, and at least 2 terminal next to terminal hydroxyl groups of the formula —CHR—OH wherein R is —H and/or —CH$_3$.

2. An alkyd resin mixture in accordance with claim 1 wherein the polyols have a molecular weight of from about 300 to about 800 g/mole.

3. An alkyd resin mixture in accordance with claim 1 wherein the polyols are present in a quantity of from about 5 to about 30% by weight, based on the weight of the alkyd resin mixture.

4. An alkyd resin mixture in accordance with claim 1, wherein the polyols are present in a quantity of from about 10 to about 20% by weight, based on the weight of the alkyd resin mixture.

5. An alkyd resin mixture in accordance with claim 1 wherein the polyols are polyether polyols or polyester polyols or both.

6. An alkyd resin mixture in accordance with claim 5 wherein the polyols contain up to 4 terminal or next to terminal hydroxyl groups.

7. An alkyd resin mixture in accordance with claim 5 wherein the polyols are reaction products of (a) a compound selected from the group consisting of glycerol, trimethylol ethane, trimethylol propane, di-(trimethylolpropane) and pentaerythritol, and (b) a compound selected from the group consisting of ethylene oxide, propylene oxide, butene oxide, isobutene oxide, and tetrahydrofuran.

8. An alkyd resin mixture in accordance with claim 1 wherein the polyols are reaction products of glycerol, trimethylol ethane, di-(trimethylolpropane) or pentaerythritol with caprolactone.

9. An alkyd resin mixture in accordance with claim 1 wherein from about 5 to about 40% by weight, based on the weight of the resin mixture, of a fatty acid modifying agent was present in the formation of said reaction products.

10. An alkyd resin mixture in accordance with claim 1 wherein a C$_8$–C$_{22}$ alkene oxide modifying agent was present in the formation of said reaction products.

11. An alkyd resin mixture in accordance with claim 9 wherein a C$_8$–C$_{22}$ alkene oxide modifying agent was also present in the formation of said reaction products.

12. An alkyd resin mixture in accordance with claim 1 wherein said mixture has an acid number of from 5 to 35, and an —OH number of >100 mg of KOH/g.

13. An alkyd resin mixture in accordance with claim 12 wherein said mixture has an acid number of from 15 to 30.

14. An alkyd resin mixture in accordance with claim 12 wherein said mixture has an acid number of from 20 to 25.

15. An alkyd resin mixture in accordance with claim 12 wherein said mixture has an —OH number of >200 mg of KOH/g.

16. An alkyd resin mixture in accordance with claim 15 wherein said mixture was prepared by first forming a reaction product having an acid number of from 40 to 180 and then reacting said first formed reaction product with glycidol until a product with an acid number of from 5 to 35 is obtained.

17. An alkyd resin mixture for use in stoving water lacquers comprising a mixture of
(a) at least one alkyd resin containing from about 5 to about 30% by weight of 2,3-dihydroxypropyl groups and an acid number of from about 5 to about 35; and
(b) from about 5 to about 30% by weight, based on the total weight of the alkyd resin mixture, of a polyol having an average molecular weight of from about 200 to about 2000 g/mole, an average —OH functionality of >2, and at least 2 terminal or next to terminal hydroxyl groups of the formula —CHR—OH wherein R is —H and/or —CH$_3$.

18. An alkyd resin mixture in accordance with claim 17 wherein from about 10 to about 20% by weight of (b) is present in the alkyd resin mixture.

19. A stoving water lacquer containing the alkyl resin mixture of claim 1.

20. A stoving water lacquer containing the alkyl resin mixture of claim 17.

21. An alkyd resin mixture in accordance with claim 17 wherein the polyols of (b) contain up to 4 terminal next to terminal hydroxyl groups.

* * * * *